UNITED STATES PATENT OFFICE 2,518,576

VULCANIZATION OF ISOBUTYLENE RUBBER

Bernard M. Sturgis, Pitman, N. J., and Joseph H. Trepagnier, Wilmington, Del., assignors to E. I. du Pont de Nemours & Company, Wilmington, Del., a corporation of Delaware No Drawing. Application January 21, 1944, Serial No. 519,190

11 Claims. (Cl. 260—79.5)

This invention relates to an improved process for the vulcanization of isobutylene rubber, currently referred to in the trade as "Butyl" rubber or "GR-I," and more particularly to a process wherein vulcanization of such rubber is carried out by the use of dinitrosobenzenes.

As pointed out by Haworth & Baldwin in Ind. & Eng. Chem. 34, page 1301 (1942), Butyl rubber is a generic name applied to a variety of vulcanizable elastic copolymers of isobutylenes and small amounts of diolefines. The diolefines are usually chosen to give a final product which has only a small percentage of the unsaturation of natural rubber. The present invention is particularly applicable to isobutylene rubber, a rubbery co-polymer of a major amount of isobutylene with a minor amount of diolefine, having a range of unsaturation of from 0.1% to 10% of the unsaturation of natural rubber. Since the term "Butyl rubber" as used by Haworth and Baldwin and as now commonly employed in industry is a trade name, the term "isobutylene rubber" will be employed in this application to designate the same material, such term being an identification of the origin and nature of the synthetic rubber to which the present invention relates.

Isobutylene rubber is unique among the commercial synthetic elastomers because of the small amount of chemical unsaturation that it contains. This limited amount of unsaturation leads to the production of vulcanizates which are marked by excellent chemical stability and which on this account have numerous important potential uses. This low unsaturation, however, as well as being an advantage, is also a disadvantage in that it makes isobutylene rubber difficult to vulcanize. When vulcanized in the usual manner using sulfur as the vulcanizing agent and a thiuram accelerator, isobutylene rubber cures quite slowly even at high temperatures and gives only low modulus vulcanizates. A large number of the known accelerators for the vulcanization of rubber have been tested as accelerators for isobutylene rubber vulcanization, but only a few of the most active, particularly members of the thiuram and dithiocarbamate classes, have been found effective. Vulcanizates produced by the use of even the best of these accelerators together with sulfur are characterized by low elongations, high compression set, poor resilience at room temperature, and considerable hot flow. These characteristics limit the field of usefulness of isobutylene rubber to a considerable extent.

It is therefore an object of this invention to provide an improved method for vulcanizing isobutylene rubber by which it can be vulcanized more rapidly than has been possible heretofore, and which will provide isobutylene rubber vulcanizates with improved physical properties.

We have found that the vulcanization of isobutylene rubber can be materially accelerated, and that the isobutylene rubber vulcanizates obtained exhibit improved physical properties, when the vulcanization of the isobutylene rubber is carried out in combination with suitable organic accelerators and a meta- or para-dinitrosobenzene.

We have found that dinitrosobenzenes operate as powerful activators for sulfur accelerator cures of isobutylene rubber, and enable the preparation of vulcanizates which have a considerably faster rate of cure without producing scorchiness, and which lead to the production of vulcanizates having much higher moduli, good tensile strength, less compression set, less hot flow, lower heat build-up, improved resilience, improved properties at elevated temperatures, and greater resistance toward heat aging.

The following examples are given to illustrate the invention, together with comparisons of the results obtained in the vulcanization of similar stocks wherein the improvement of this invention has not been employed. Unless otherwise specified, the parts used are by weight.

The following stocks were prepared containing the ultra-accelerator most commonly used for the vulcanization of isobutylene rubber. GR-I, which is one type of isobutylene rubber, was used in these stocks. This sample contained 0.5% phenyl-beta-naphthylamine and 1% zinc stearate when received from the manufacturer.

| | Stock | | | |
|---|---|---|---|---|
| | A | B | C | D |
| GR-I (isobutylene rubber) | 100 | 100 | 100 | 100 |
| Reinforcing Furnace Black | 50 | 50 | 50 | 50 |
| Zinc Oxide | 5 | 5 | 5 | 5 |
| Stearic Acid | 3 | 3 | 3 | 3 |
| Sulfur | 2 | 4 | 2 | 2 |
| Tetramethyl Thiuram Disulfide | 1 | 1 | 2 | 1 |
| Diphenylguanidine | | | | 1 |

Portions of these stocks were cured for 30 minutes at 307° F. in the form of small rings and tested with the Williams tension testing machine. The results appear in Table I.

TABLE I

| | Stock | | | |
|---|---|---|---|---|
| | A | B | C | D |
| Modulus at 300% Elongation, Lbs./Sq. In. | 400 | 425 | 425 | 225 |
| Tensile at Break, Lbs./Sq. In. | 2,025 | 1,850 | 1,850 | 1,775 |

It can be seen from these tests that doubling the amount of sulfur or accelerators makes very little difference in the cure. Adding a basic accelerator actually has a deleterious effect.

We have now found that the rate of vulcanization of isobutylene rubber can be markedly increased by using a small amount of a meta- or para-dinitrosobenzene in combination with the accelerator. Furthermore, the vulcanizates so obtained have higher moduli and are superior in many other physical properties to those obtained with the accelerator alone.

To demonstrate the improvement in rate of vulcanization and increase in modulus obtained by using a dinitrosobenzene, the following stocks were prepared.

| | Stock | | | |
|---|---|---|---|---|
| | A | E | F | G |
| GR-1 (isobutylene rubber) | 100 | 100 | 100 | 100 |
| Reinforcing Furnace Black | 50 | 50 | 50 | 50 |
| Zinc Oxide | 5 | 5 | 5 | 5 |
| Stearic Acid | 3 | 3 | 3 | 3 |
| Sulfur | 2 | 2 | 2 | 2 |
| Tetramethyl Thiuram Disulfide | 1 | 1 | 1 | 1 |
| para-Dinitrosobenzene | | 0.3 | 0.5 | 1.0 |

These stocks were vulcanized and tested as before. The results obtained are shown in Table II.

TABLE II

| Cured | Temp. of Cure, °F. | Stock A | Stock E | Stock F | Stock G |
|---|---|---|---|---|---|
| | | Modulus at 300% Elongation, Lbs./Sq. In. | | | |
| 30 minutes | 307 | 400 | 575 | 625 | 1,000 |
| 60 minutes | 307 | 600 | 775 | 800 | 1,300 |
| | | Tensile at Break, Lbs./Sq. In. | | | |
| 30 minutes | 307 | 2,025 | 2,225 | 2,125 | 2,075 |
| 60 minutes | 307 | 2,100 | 2,625 | 2,250 | 2,000 |

These tests show that relatively small amounts of paradinitrosobenzene markedly activate the cure, increasing the rate of cure considerably and producing vulcanizates with higher moduli and in some instances higher tensile strengths.

Even more pronounced effects are obtained when isobutylene rubber stocks containing no stearic acid are accelerated with a mixture of an accelerator and a dinitrosobenzene. The data of Table III illustrate this effect. These results were obtained with the stocks listed below, the tests being made on dumbbell strips with a Scott testing machine. Stock H, which is similar to those which have been recommended [see Industrial and Engineering Chemistry, 34, page 1302 (1942)] for isobutylene rubber, is included for comparison.

| | Stock | | | | |
|---|---|---|---|---|---|
| | H | I | J | K | L |
| GR-I (isobutylene rubber) | 100 | 100 | 100 | 100 | 100 |
| Reinforcing Furnace Black | 50 | 50 | 50 | 50 | 50 |
| Zinc Oxide | 5 | 5 | 5 | 5 | 5 |
| Sulfur | 2 | 2 | 2 | 2 | 2 |
| Paraffin | | | 1 | 1 | 1 |
| Stearic Acid | 1 | | | | |
| Tetramethyl Thiuram Disulfide | 1 | 1 | 1 | 1 | 1 |
| Mercaptobenzothiazole | 1 | | | | |
| para-Dinitrosobenzene | | | 0.075 | 0.15 | 0.3 |

TABLE III

| Cured | Temp. of Cure, °F. | Stock H | Stock I | Stock J | Stock K | Stock L |
|---|---|---|---|---|---|---|
| | | Modulus at 300% Elongation, Lbs./Sq. In. | | | | |
| 15 minutes | 307 | 300 | | | | 625 |
| 30 minutes | 307 | 425 | 425 | 550 | 675 | 950 |
| 60 minutes | 307 | 600 | 625 | 825 | 925 | 1,250 |
| | | Tensile at Break, Lbs./Sq. In. | | | | |
| 15 minutes | 307 | 2,575 | | | | 2,575 |
| 30 minutes | 307 | 2,700 | 1,850 | 2,250 | 2,625 | 2,725 |
| 60 minutes | 307 | 2,475 | 2,175 | 2,300 | 2,550 | 2,750 |
| 60 minutes | 227 | 50 | 50 | 50 | 150 | 900 |

The results in Table III clearly demonstrate the remarkable increase in rate of vulcanization obtained by using small amounts of a dinitrosobenzene. For example, Stock L, which contains 0.3 part of para-dinitrosobenzene, cures about four times faster than Stock H or I as shown by the 15 minute cure of the former stock having the same modulus as the 60 minute cure of the other two. The fact that such an increase in modulus can be obtained with as little as 0.075 part of para-dinitrosobenzene is indeed remarkable and surprising when one considers the data of Table I.

In addition to improving the rate of cure and increasing the modulus of the vulcanizates, the use of dinitrosobenzenes improves other physical properties of the vulcanizates such as compression set and hot flow. The improvement in compression set of stocks containing dinitrosobenzene over a stock such as H, is shown in Table IV. These measurements were made by the A. S. T. M. procedure, Method B (A. S. T. M. Standards for Rubber Products, D 395–40T), except the pellets were compressed for 48 hours at room temperature.

The improvement in the properties of isobutylene rubber vulcanizates at elevated temperatures caused by the addition of the activators of this invention, is illustrated in the following table, in which the results of tensile and tear tests run at 70° C. on stocks I and L are given.

TABLE III-A

| Cured at 307° F. | Tensile at Break at 70° C., p. s. i. | | Tear Resistance at 70° C., p. s. i. | |
|---|---|---|---|---|
| | Stock I | Stock L | Stock I | Stock L |
| 30 minutes | 1,650 | 2,000 | 185 | 250 |
| 60 minutes | 1,450 | 2,150 | 185 | 235 |

The resilience of stocks H and J were measured on the Yerzley Oscillograph. The per cent resilience of stock H after vulcanization was 49.4, while that of stock J after vulcanization was 57.2, showing an appreciable increase derived from the use of para-dinitrosobenzene.

The heat build-up of stocks H and J were measured by means of a Goodrich Flexometer, using a ⅛ inch stroke. The stock vulcanized with para-dinitrosobenzene was found to have somewhat lower heat build-up, as illustrated in the following table:

TABLE III-B

*Heat build-up in degrees centigrade*

| Flexing | Stock H | Stock J |
|---|---|---|
| 5 minutes | 30 | 26 |
| 10 minutes | 40 | 36 |
| 20 minutes | 46 | 40 |

TABLE IV

| Cured | Temp. of Cure, °F. | Stock H | Stock J | Stock K |
|---|---|---|---|---|
| | | Per cent Compression Set | | |
| 65 minutes | 307 | 11.9 | 6.0 | 5.4 |

Activation is obtained with meta-dinitrosobenzene as well as with para-dinitrosobenzene. "Ortho-Dinitrosobenzene" has been shown to be benzofurazan oxide (see Hammick, Edwardes and Steiner, Journal of the Chemical Society 1931, page 3308). Table V shows comparable tests on these compounds. The results were obtained with the Williams tension testing machine on rings cured for 30 minutes at 307° F.

| | Stock | | | |
|---|---|---|---|---|
| | M | N | O | P |
| G R-I (isobutylene rubber) | 100 | 100 | 100 | 100 |
| Reinforcing Furnace Black | 50 | 50 | 50 | 50 |
| Zinc Oxide | 5 | 5 | 5 | 5 |
| Sulfur | 2 | 2 | 2 | 2 |
| Tetramethyl Thiuram Disulfide | 1 | 1 | 1 | 1 |
| para-Dinitrosobenzene | | 0.3 | | |
| meta-Dinitrosobenzene | | | 0.3 | |
| "ortho-Dinitrosobenzene" (Benzofurazan Oxide) | | | | 1.0 |

TABLE V

| | Stock M | Stock N | Stock O | Stock P |
|---|---|---|---|---|
| Modulus at 300% Elongation, Lbs./Sq. In. | 600 | 1,275 | 950 | 540 |
| Tensile at Break, Lbs./Sq. In. | 2,150 | 2,500 | 2,300 | 1,730 |

Many types of accelerators can be used in combination with these dinitroso compounds. This is illustrated by the data in Table VI. The base stock used in these tests had the following composition:

*Base stock*

| | |
|---|---|
| GR-I (Butyl rubber) | 100 |
| Reinforcing furnace black | 50 |
| Zinc oxide | 5 |
| Sulfur | 2 |

The accelerators shown in the table were added to this base stock prior to vulcanization. The stocks were cured for 30 minutes at 307° F. in the form of small rings and tested with the Williams tension testing machine.

TABLE VI

| Acceleration Used with Base Stock | | Modulus at 300N Elongation (Lbs./Sq. In.) | Tensile at Break (Lbs./Sq. In.) |
|---|---|---|---|
| Tetramethyl Thiuram Disulfide | 1.0 | 600 | 2,150 |
| Do | 1.0 | 1,275 | 2,500 |
| para-Dinitrosobenzene | 0.3 | | |
| Tetramethyl Thiuram Disulfide | 1.0 | 575 | 2,350 |
| Mercaptobenzothiazole | 0.5 | | |
| Tetramethyl Thiuram Disulfide | 1.0 | 1,300 | 2,400 |
| Mercaptobenzothiazole | 0.5 | | |
| para-Dinitrosobenzene | 0.3 | | |
| Dipentamethylene Thiuram Tetrasulfide | 1.0 | 450 | 2,025 |
| Do | 1.0 | 1,250 | 2,225 |
| para-Dinitrosobenzene | 0.3 | | |
| Ferric Dimethyl Dithiocarbamate | 1.0 | 375 | 1,725 |
| Do | 1.0 | 1,100 | 1,700 |
| para-Dinitrosobenzene | 0.3 | | |
| Selenium Diethyl Dithiocarbamate | 1.0 | 750 | 1,775 |
| Do | 1.0 | 1,325 | 2,275 |
| para-Dinitrosobenzene | 0.3 | | |
| 2,4-Dinitrophenyl Ester of Pentamethylene Dithiocarbamic Acid | 1.5 | 225 | 1,125 |
| Do | 1.5 | 625 | 1,350 |
| para-Dinitrosobenzene | 0.3 | | |
| Mercaptobenzothiazole | 1.5 | 100 | 875 |
| Do | | 875 | 1,500 |
| para-Dinitrosobenzene | 0.3 | | |
| Piperdinium Pentamethylene Dithiocarbamate | 1.0 | 500 | 1,700 |
| Do | 1.0 | 750 | 1,850 |
| para-Dinitrosobenzene | 0.3 | | |
| Lead Dibutyl Dithiocarbamate | 1.0 | 600 | 1,850 |
| Do | 1.0 | 850 | 2,300 |
| para-Dinitrosobenzene | 0.3 | | |
| Tetramethyl Thiuram Monosulfide | 1.0 | 750 | 2,050 |
| Do | 1.0 | 1,200 | 2,625 |
| para-Dinitrosobenzene | 0.3 | | |

These data show that a wide variety of accelerators are effective, although certain ones such as tetramethyl thiuram disulfide are outstanding in producing high moduli and tensiles. In general, any accelerator which can be used to vulcanize isobutylene rubber can be used more effectively in combination with a meta- or para-dinitrosobenzene. The preferred class of accelerators with which the dinitrosobenzenes are employed are the thiuram sulfides, including the di- and poly-sulfides, and the dithiocarbamates including their metal salts and amine salts. Other accelerators, which are known to accelerate the vulcanization of isobutylene rubber, may be employed. An isobutylene rubber accelerator will be defined as an organic compound which will produce a vulcanizate having at least a 750 lb./sq. in. tensile strength when 2 parts are compounded in the base stock above and vulcanized at 307° F. for 30 minutes.

Stocks Q and R, given below, show the effect of paradinitrosobenzene on the vulcanization of isobutylene rubber when a different type of carbon black is used, while stocks S and T show that the use of para-dinitrosobenzene is also applicable to Butyl B 1.45, another type of butyl rubber. The results on these stocks are presented in Table VII. These results are also based on data obtained with a Williams tension testing machine on cures of 30 minutes at 307° F.

| | Stock | | | |
|---|---|---|---|---|
| | Q | R | S | T |
| G R-I (isobutylene rubber) | 100 | 100 | | |
| Butyl B 1.45 (isobutylene rubber) | | | 100 | 100 |
| Semi-Reinforcing Furnace Black | 36 | 36 | | |
| Reinforcing Furnace Black | | | 40 | 40 |
| Channel Black | | | 10 | 10 |
| Zinc Oxide | 5 | 5 | 5 | 5 |
| Sulfur | 2 | 2 | 1.5 | 1.5 |
| Stearic Acid | 3 | 3 | 3 | 3 |
| Tetramethyl Thiuram Disulfide | 1 | 1 | 1 | 1 |
| para-Dinitrosobenzene | | 0.3 | | 0.3 |

TABLE VII

|  | Stock Q | Stock R | Stock S | Stock T |
|---|---|---|---|---|
| Modulus at 300%: Elongation, Lbs./Sq. In | 350 | 650 | 400 | 875 |
| Tensile at Break, Lbs./Sq. In | 1,900 | 2,525 | 1,375 | 1,575 |

The meta- and para-nitrosobenzenes which may be employed in carrying out the process of this invention are those which have the general formula:

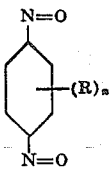

and

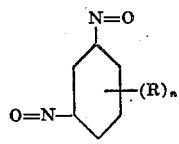

wherein R may be alkyl, cycloalkyl, aralkyl, alkoxy or halogen and $n$ is 0 to 3. Straight aliphatic derivatives of the above formula may be those containing either the lower or higher alkyl chains, such as those up to 20 carbon atoms. The cycloalkyl derivatives are preferably those which contain only one ring such as the cyclohexyl and the simpler terpenes, such as pinene, etc. In the aralkyl groups, the alkyl chain is preferably not more than 10 carbon atoms in length, and the aryl group attached thereto is of the benzene or naphthalene series. The alkoxy groups are preferably those which contain less than 10 carbon atoms. The halogens may include fluorine, chlorine and bromine. The simpler substituted derivatives of this class include such compounds as 2-methyl-1,4-dinitrosobenzene, 2-fluoro-1,4-dinitrosobenzene, 5-methoxy - 1,3 - dinitrosobenzene, 2-methyl-5-isopropyl - 1,4 - dinitrosobenzene, 5 - chloro-1,3-dinitrosobenzene, 2-benzyl - 1,4 - dinitrosobenzene and 2-cyclohexyl-1,4-dinitrosobenzene.

The para-dinitrosobenzenes can be prepared by the method of Ruggli and Petitjean [Hevetica Chimica Acta 21, page 723 (1938)]. The meta-dinitrosobenzenes can be prepared by the method of Alway and Gortner, Berichte, 38, page 1899 (1905).

The amount of the dinitroso compound used in carrying out this invention may be varied over a wide range, and will depend upon properties desired in the resulting vulcanizate. Decided improvement in the vulcanization has been obtained when from 0.01 to 3 parts of the dinitroso compound per one hundred parts of isobutylene rubber are employed, although the preferred range is from 0.05 to 2 parts of the dinitroso compound per one hundred parts of elastomer.

The amount of vulcanization accelerator employed will of course depend upon the activity of the particular accelerator. In general, the amounts will lie between 0.05 and 4 parts of accelerator for one hundred parts of the isobutylene rubber, although amounts outside of this range may be employed where the accelerator is one having greater or less activity. In general, the amount of accelerator employed will range from 0.2 to 2 parts per one hundred parts of isobutylene rubber.

The sulfur employed in effecting vulcanization may be used either in the form of elemental sulfur or as a sulfur-yielding compound. In some instances, such as when penta-methylene-thiuram-tetrasulfide is used, the one compound serves simultaneously as accelerator and as a source of sulfur. The amount of sulfur is not critical, and will depend to a large extent upon the type and activity of the accelerator employed in the mix. Certain active types of accelerator will require only relatively small amounts of sulfur, while other less active accelerators will require larger amounts of sulfur. The presence of a large excess of sulfur is not harmful, while in most cases 0.05 part of sulfur per one hundred parts of elastomer will be found to be the lowest practical limit. The invention resides not in the use of particular amounts of sulfur or accelerator, but more particularly to the use of the combination of the dinitrosobenzene with sulfur and vulcanization accelerator, and the proportions will vary, depending upon the circumstances such as the type of cure desired and the type of accelerator employed, and upon the particular isobutylene rubber being worked.

The use of metal oxides in this process is advantageous, and leads to improved physical properties of the vulcanizates. Although the amount to be employed is not critical, the process is carried out preferably in the presence of at least 0.5 part of a metal oxide per one hundred parts of elastomer. The invention, however, is not limited in the use of any metal oxide. The process can be carried out in the presence of such materials as zinc stearate or other additives normally used in the vulcanization of this type of rubber.

Although most of the tests given in the above examples were carried out on stocks containing a high loading of carbon black, other amounts and other types of reinforcing agents, fillers and extenders can be used. This method of vulcanization is also applicable to stocks which contain softeners, elasticators, and other compounding ingredients which are consistent with good isobutylene rubber compounding practice.

In this specification, the isobutylene rubber designated as "GR–I" is a isobutylene rubber produced in government plants, and which is being perfected for military and civil needs. For further information concerning these isobutylene rubbers, reference may also be made to Ind. Eng. Chemistry 32, 1283 (1940).

We claim:

1. The process of vulcanizing isobutylene rubber, being a rubbery co-polymer of a major amount of isobutylene with a minor amount of a diolefine, which comprises incorporating into the vulcanizable isobutylene rubber stock, containing sulfur and an isobutylene rubber vulcanization accelerator of the class consisting of dithiocarbamates, thiuram sulfides and mercaptobenzothiazoles, a compound of the class consisting of a meta- and a para-dinitrosobenzene, the amount of the dinitrosobenzene being from 0.075 to 3 parts, based on 100 parts of isobutylene rubber being vulcanized, and subjecting the isobutylene rubber stock to vulcanizing temperatures.

2. The process of vulcanizing isobutylene rubber, being a rubbery co-polymer of a major amount of isobutylene with a minor amount of a diolefine, which comprises incorporating into the vulcanizable isobutylene rubber stock, containing sulfur and a dithiocarbamate vulcanization accelerator, a compound of the class consisting of a meta- and a para-dinitrosobenzene, the amount of the dinitrosobenzene being from 0.075 to 3 parts, based on 100 parts of isobutylene rubber being vulcanized, and subjecting the isobutylene rubber stock to vulcanizing temperatures.

3. The process of vulcanizing isobutylene rubber, being a rubbery co-polymer of a major amount of isobutylene with a minor amount of a diolefine, which comprises incorporating into the vulcanizable isobutylene rubber stock, containing sulfur and a thiuram sulfide accelerator, a compound of the class consisting of a meta- and a para-dinitrosobenzene, the amount of the dinitrosobenzene being from 0.075 to 3 parts, based on 100 parts of isobutylene rubber being vulcanized, and subjecting the isobutylene rubber stock to vulcanizing temperatures.

4. The process of vulcanizing isobutylene rubber, being a rubbery co-polymer of a major amount of isobutylene with a minor amount of a diolefine, which comprises incorporating into the vulcanizable isobutylene rubber stock, containing sulfur and a thiuram disulfide accelerator, from 0.075 to 3 parts of para-dinitrosobenzene, based on 100 parts of isobutylene rubber being vulcanized, and subjecting the isobutylene rubber stock to vulcanizing temperatures.

5. The process of vulcanizing isobutylene rubber, being a rubbery co-polymer of a major amount of isobutylene with a minor amount of a diolefine, which comprises incorporating into the vulcanizable isobutylene rubber stock, containing sulfur and tetramethyl thiuram disulfide, from 0.075 to 3 parts of para-dinitrosobenzene, based on 100 parts of isobutylene rubber being vulcanized, and subjecting the isobutylene rubber stock vulcanizing temperatures.

6. A vulcanized isobutylene rubber, being a rubbery co-polymer of a major amount of isobutylene with a minor amount of a diolefine, obtained by vulcanizing an isobutylene rubber stock containing sulfur, an isobutylene rubber vulcanization accelerator of the class consisting of dithiocarbamates, thiuram sulfides and mercaptobenzothiazoles, and from 0.075 to 3 parts of a dinitrosobenzene of the class consisting of a meta- and a para-dinitrosobenzene, based on 100 parts of the isobutylene rubber, said isobutylene rubber being one having a range of unsaturation of from 0.1% to 10% of the unsaturation of natural rubber.

7. A vulcanized isobutylene rubber, being a rubbery co-polymer of a major amount of isobutylene with a minor amount of a diolefine, obtained by vulcanizing an isobutylene rubber stock containing sulfur, a dithiocarbamate vulcanization accelerator, and from 0.075 to 3 parts of a dinitrosobenzene of the class consisting of a meta- and a para-dinitrosobenzene, based on 100 parts of the isobutylene rubber, said isobutylene rubber being one having a range of unsaturation of from 0.1% to 10% of the unsaturation of natural rubber.

8. A vulcanized isobutylene rubber, being a rubbery co-polymer of a major amount of isobutylene with a minor amount of a diolefine, obtained by vulcanizing an isobutylene rubber stock containing sulfur, a thiuram disulfide accelerator, and from 0.075 to 3 parts of a para-dinitrosobenzene, based on 100 parts of the isobutylene rubber, said isobutylene rubber being one having a range of unsaturation of from 0.1% to 10% of the unsaturation of natural rubber.

9. A vulcanized isobutylene rubber, being a rubbery co-poylmer of a major amount of isobutylene with a minor amount of a diolefine, obtained by vulcanizing an isobutylene rubber stock containing sulfur, tetramethyl thiuram disulfide and from 0.075 to 3 parts of paradinitrosobenzene, based on 100 parts of the isobutylene rubber, said isobutylene rubber being one having a range of unsaturation of from 0.1% to 10% of the unsaturation of natural rubber.

10. The process of vulcanizing isobutylene rubber, being a rubbery co-polymer of a major amount of isobutylene and a minor amount of a diolefine, and which comprises incorporating into the vulcanizable isobutylene rubber stock containing sulfur and a tetramethyl thiuram sulfide vulcanization accelerator a paradinitroso benzene, the amount of dinitroso benzene being .5 part based on 100 parts of the isobutylene rubber being vulcanized and subjecting the isobutylene stock to vulcanizing temperatures.

11. A vulcanized isobutylene rubber, being a rubbery co-polymer of a major amount of isobutylene and a minor amount of a diolefine, obtained by vulcanizing the isobutylene rubber stock containing sulfur, a tetramethyl thiuram sulfide vulcanization accelerator and .5 part of a paradinitroso benzene, based on 100 parts of isobutylene rubber.

BERNARD M. STURGIS.
JOSEPH H. TREPAGNIER.

REFERENCES CITED

The following references are of record in the file of this patent:

UNITED STATES PATENTS

| Number | Name | Date |
|---|---|---|
| 1,249,180 | Ostromislensky | Dec. 4, 1917 |
| 2,035,698 | Fisher | Mar. 31, 1936 |
| 2,170,191 | Fisher | Aug. 22, 1939 |
| 2,311,004 | Thomas | Feb. 16, 1943 |
| 2,391,742 | Roberts | Dec. 25, 1945 |

OTHER REFERENCES

P. 628 Beilstein's Hand buch der Organische Chemie: 4th ed., vol. 7, 1925.

Industrial and Engineering Chemistry article by Rehner et al., vol. 38, No. 5, pages 500–56, May 1946.

Certificate of Correction

Patent No. 2,518,576                                              August 15, 1950

BERNARD M. STURGIS ET AL.

It is hereby certified that error appears in the printed specification of the above numbered patent requiring correction as follows:

Column 6, Table VI, second line of the heading to the second column thereof, for "300N" read *300%*; same table, first column thereof, line 23, for "Do_____" read *Do_____ 1.5*; column 8, line 64, for "thiouram" read *thiuram*; column 9, line 39, after the word "stock" insert *to*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*